United States Patent [19]

Long

[11] 4,205,508
[45] Jun. 3, 1980

[54] GROUND SPEED DRIVE FOR PEANUT COMBINE

[75] Inventor: William R. Long, Tarboro, N.C.

[73] Assignee: Long Mfg. N. C., Inc., Tarboro, N.C.

[21] Appl. No.: 947,126

[22] Filed: Sep. 29, 1978

[51] Int. Cl.² ............................................. A01D 89/00
[52] U.S. Cl. ................................ 56/10.2; 56/DIG. 6; 56/DIG. 15
[58] Field of Search ............ 56/10.2, 11.6, 10.3, 56/11.7, 364, DIG. 15, DIG. 6; 171/9, 101

[56] References Cited

U.S. PATENT DOCUMENTS

| | | | |
|---|---|---|---|
| 2,259,908 | 10/1941 | Raney | 56/364 |
| 2,478,324 | 8/1949 | Russell | 56/364 |
| 2,524,233 | 10/1950 | Russell | 56/364 |
| 2,749,696 | 6/1956 | Innes | 56/10.3 |
| 2,780,904 | 2/1957 | Bowie et al. | 56/364 |
| 2,785,525 | 3/1957 | Sorensen et al. | 56/364 |
| 4,142,348 | 3/1979 | Jordan | 56/10.2 |

Primary Examiner—Jay N. Eskovitz
Attorney, Agent, or Firm—Dowell & Dowell

[57] ABSTRACT

A peanut combine has a pickup that is driven selectively and automatically above a predetermined rate from a ground wheel or a power takeoff, and has means for manually disengaging the ground wheel drive for transport purposes.

1 Claim, 11 Drawing Figures

GROUND SPEED DRIVE FOR PEANUT COMBINE

BACKGROUND OF THE INVENTION

1. Field of the Invention

This invention relates to agricultural machinery and particularly that employed in the harvesting of crops such as peanuts in which a combine is moved over the ground, picking up the crop and separating the marketable portion from the vines and other extraneous material. The invention is particularly directed to the means for selectively driving the pickup mechanism.

2. Summary of the Invention

In peanut combines of the general type such as shown in the Long U.S. Pat. No. 2,974,467, there is a pickup reel which picks up the vines and feeds them into the machine for separation of the peanuts from the vines and foreign matter. The combine has moving parts, including a pickup reel, threshing cylinders, and movable separating devices, including racks, pans and one or more fans. The device is ordinarily towed behind a tractor whose takeoff shaft provides power for operation of the various elements.

The combine is ordinarily towed through the field at a speed of approximately two to four miles per hour. It is desirable, in accordance with the present invention, to provide for the driving of the pickup reel directly from the running support wheel of the combine in order that the speed of the pickup reel may be in proportion to the speed of the combine's forward motion, and to provide for this drive primarily from the wheel instead of from the tractor pto. This causes the pickup to operate more rapidly when the combine is being moved at moderate or relatively rapid speeds and insures that it will operate at a minimum speed even if the forward motion is substantially decreased or stopped, as for example, when making turns or moving over uneven ground.

A further feature of the invention is the provision of a simple manual control accessible to the driver by means of which the ground drive may be disengaged for transport purposes, the operator also being able to control the auxiliary power means such as the power takeoff.

A still further feature of the invention is the provision of a releasable driving engagement or clutch for the pickup which permits stalling of the pickup without damage to the pickup or the drive train thereto.

DESCRIPTION OF THE PREFERRED EMBODIMENT

Figure 1:
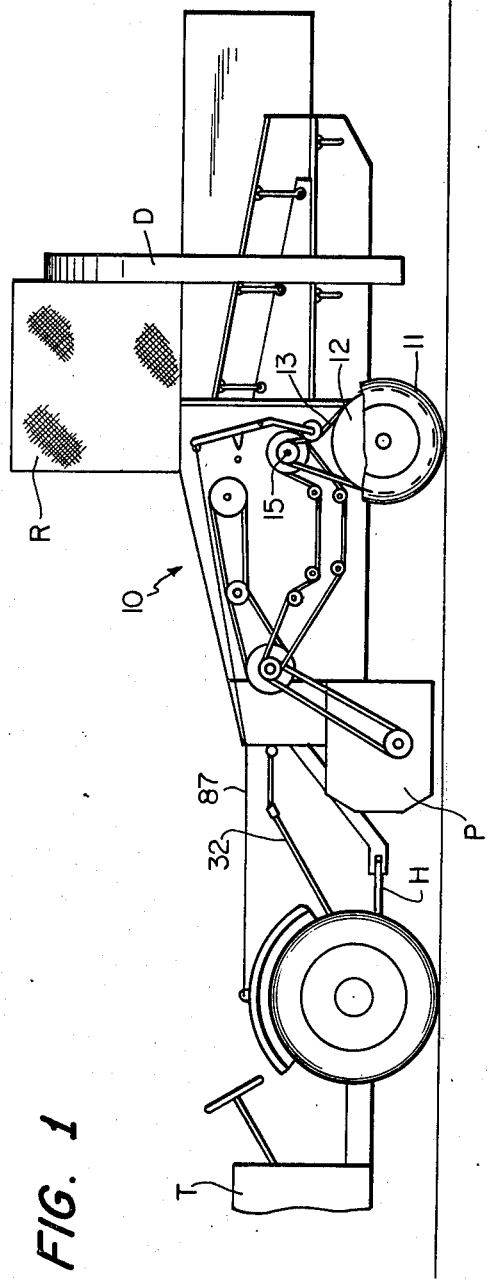
FIG. 1 is a left side elevation, with portions broken away for clarity, of a combine in accordance with the present invention, and connected to a tractor.
Figure 2:
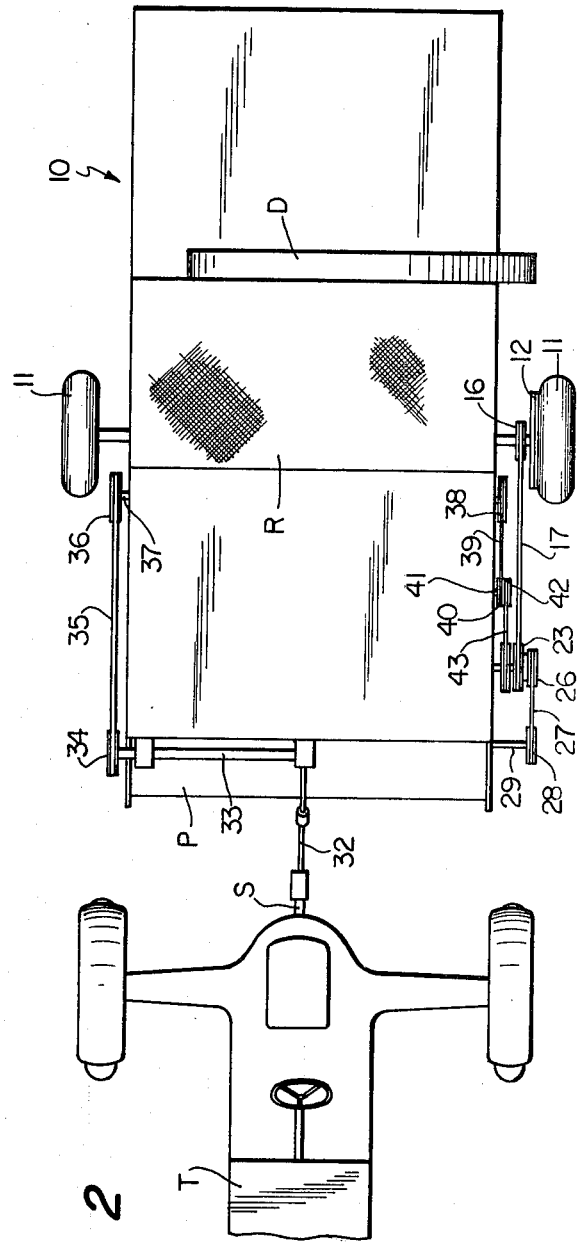
FIG. 2 is a top plan view of the embodiment of FIG. 1.
Figure 3:
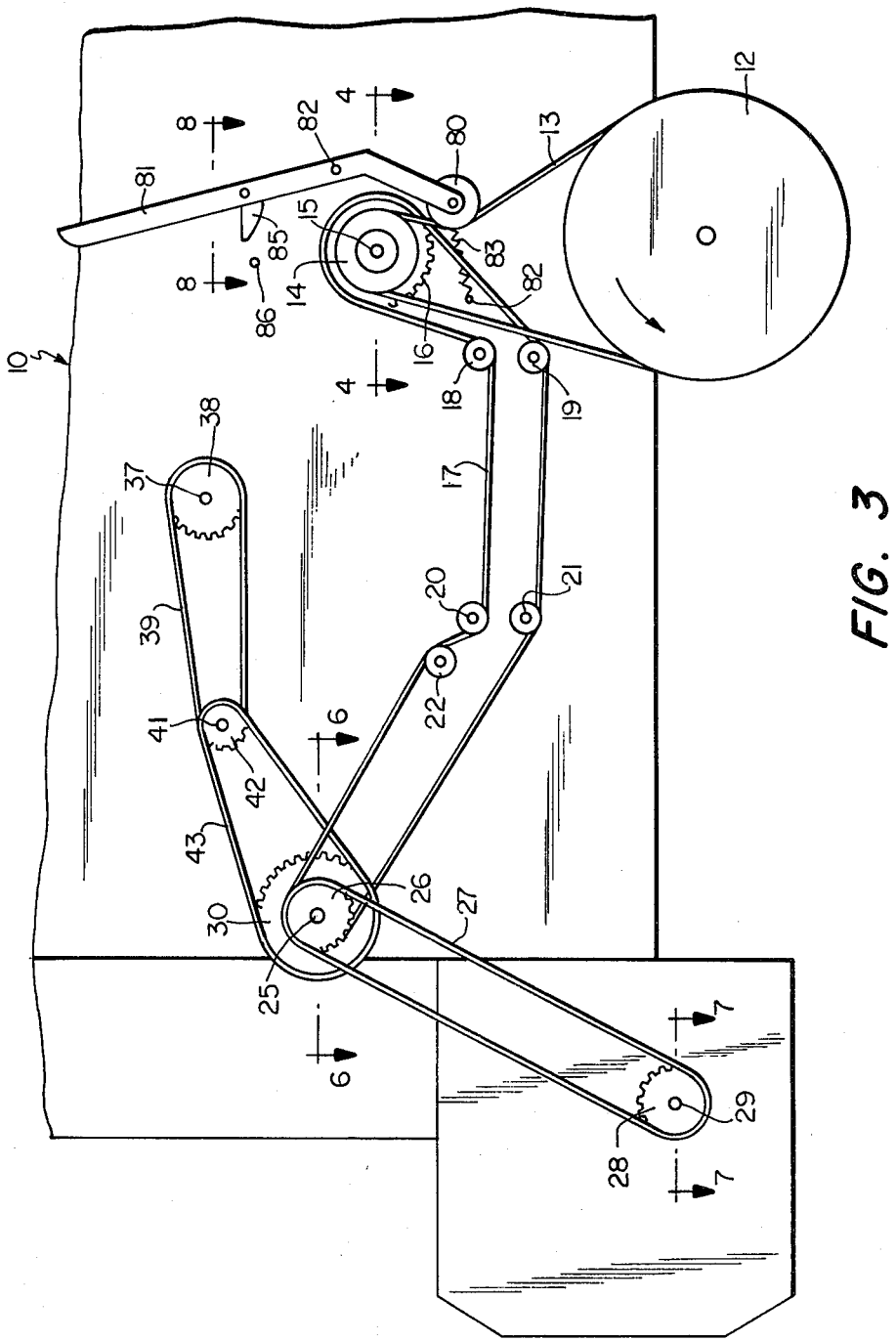
FIG. 3 is an enlarged detail of the pickup driving mechanism illustrated in FIGS. 1 and 2.

With further reference to the drawings, there is illustrated a combine 10 of the general type described in Long U.S. Pat. No. 2,974,467, which is drawn by a tractor T having a hitch H and a power takeoff shaft S. The combine runs on wheels 11 and has a pickup P at the front which lifts the vines with the peanuts thereon into the combine where the peanuts are separated from the vines and extraneous matter and such peanuts are discharged through a duct D into a receptacle R while the vines are discharged from the rear of the combine.

The present invention may be combined with various kinds of machinery, that which is shown being illustrative.

In accordance with the present invention, one of the wheels 11 has a sheave 12 engaged with the belt 13 that drives a sheave 14 rotatably mounted on a shaft 15. An overriding clutch located between the sheave 14 and the shaft 15 will be described later. Shaft 15 has a sprocket 16 mounted thereon which drives a chain 17 along a first set of idlers 18 and 19 and a second set of idlers 20 and 21 and a spaced idler 22 to a sprocket 23 which is mounted on an outer driven member 24 of an overriding clutch assembly carried on a shaft 25, as will be described later. Also mounted on the outer member 24 is a sprocket 26 which is engaged with a chain 27 which drives sprocket 28 carried by the pickup drive shaft 29.

Mounted on the shaft 25 is a sprocket 30, which is driven from the power takeoff of the tractor. By way of illustration only, the power takeoff shaft S drives a universal assembly 32, a cross shaft 33, sprocket 34, chain 35 and sprocket 36. The sprocket 36 drives a shaft 37 which may carry a rear threshing cylinder. At its other end the shaft 37 has a sprocket 38 which drives a chain 39 and a sprocket 40 mounted on a shaft 41, and such shaft 41 carries a central cylinder or transfer means. A sprocket 42 on the shaft 41 drives a chain 43 engaged with the sprocket 30, driving a lower threshing cylinder carried by the shaft 25.

Figure 4:
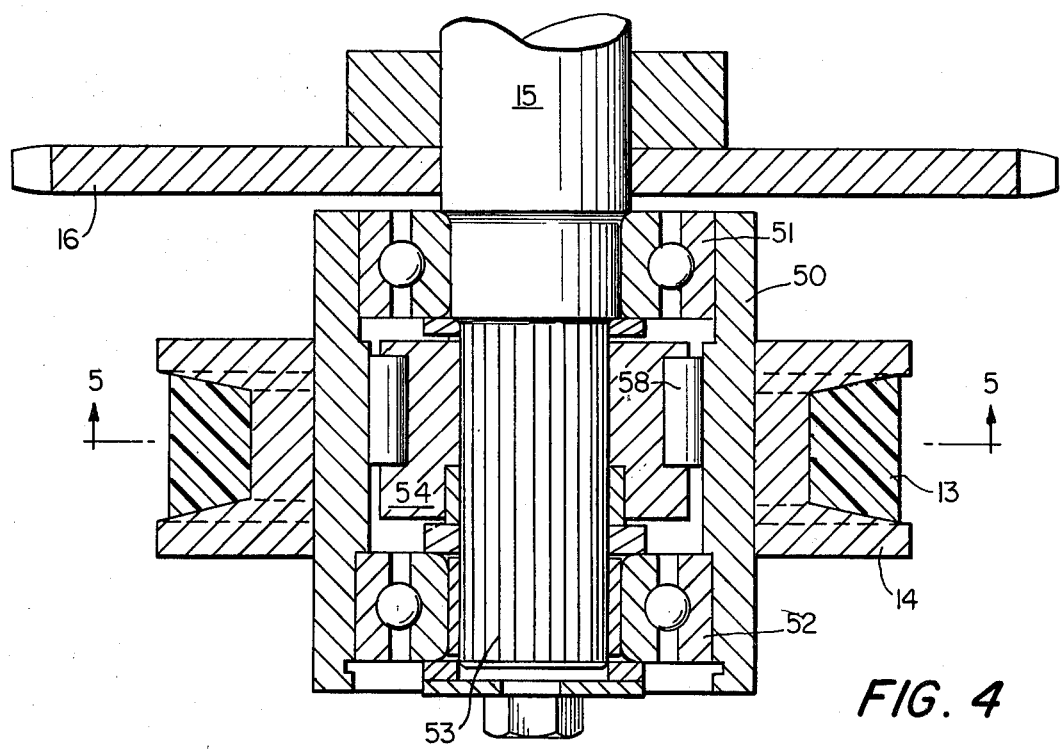
FIGS. 4, 6, 7 and 8 are sections to an enlarged scale on the lines 4—4, 6—6, 7—7 and 8—8, respectively, of FIG. 3.

With further reference to FIG. 4, the sheave 14 is mounted on outer driven member 50 which is freely supported for rotation on shaft 15 by inner and outer bearings 51 and 52. The outer end of the shaft 15 has a splined portion 53 on which inner driving member 54 is mounted and such inner driving member has a series of inclined runs 55 terminating in recesses 56 on its outer periphery. Intermediate the inclined runs of the driving member 54 and the inner periphery 57 of the driven member 50 are rollers 58. The foregoing assembly is described as an overriding roller clutch.

When the counterclockwise rotation (as viewed in FIG. 5) of the sheave 14 drives the outer member faster than the inner member is rotated as a result of being driven from the sprocket 16, the rollers 58 are wedged along the outer portions of the inclined runs 55 and thereby drive the shaft 15 and the sprocket 16.

On the other hand, in the event that the shaft 15 is driven at a faster rate by the sprocket 16, then the rollers 58 will occupy a lower position along the incline runs 55 so that the sheave will run freely on the shaft 15.

Figure 5:
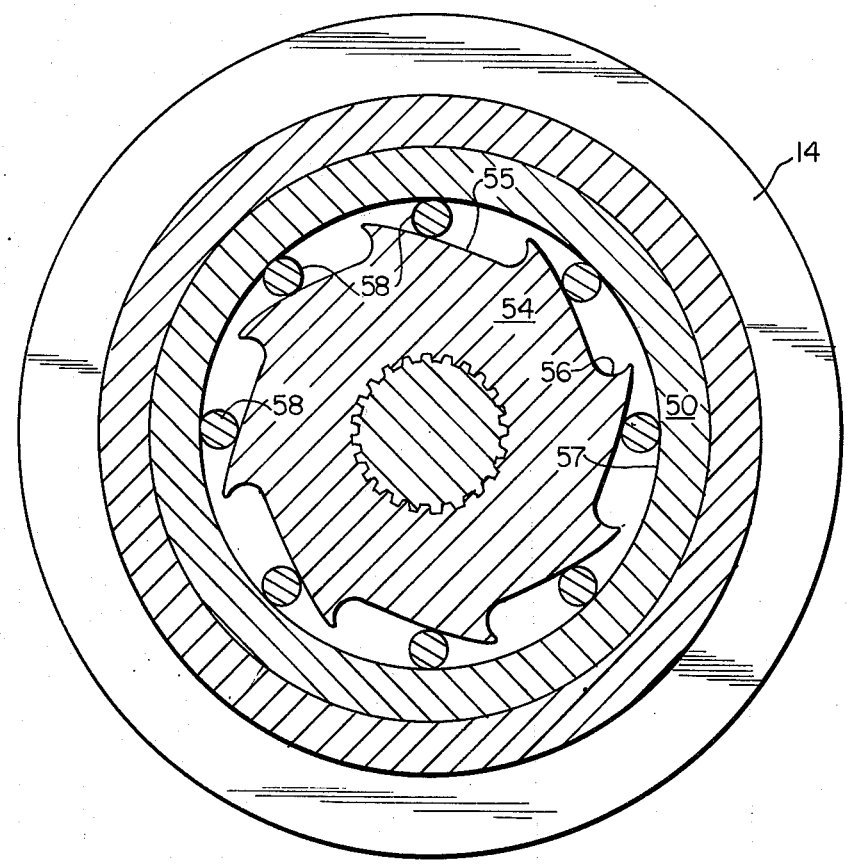
FIG. 5 is a section on the line 5—5 of FIG. 4.

At the other end of the run of chain 17 (see FIG. 6), the overriding roller clutch assembly between the sprockets 23, 26 and the shaft 25 is of a construction similar to that shown in FIGS. 4 and 5, including the driven member 24, driving member 64, and rollers 68.

Inner and outer bearings 61 and 62 are mounted on shaft 25 which has a splined portion 63 on which the driving member 64 is mounted. However, the clutch assembly of FIG. 6 is mounted for driving in the opposite direction from that illustrated in FIGS. 4 and 5.

Figure 6:
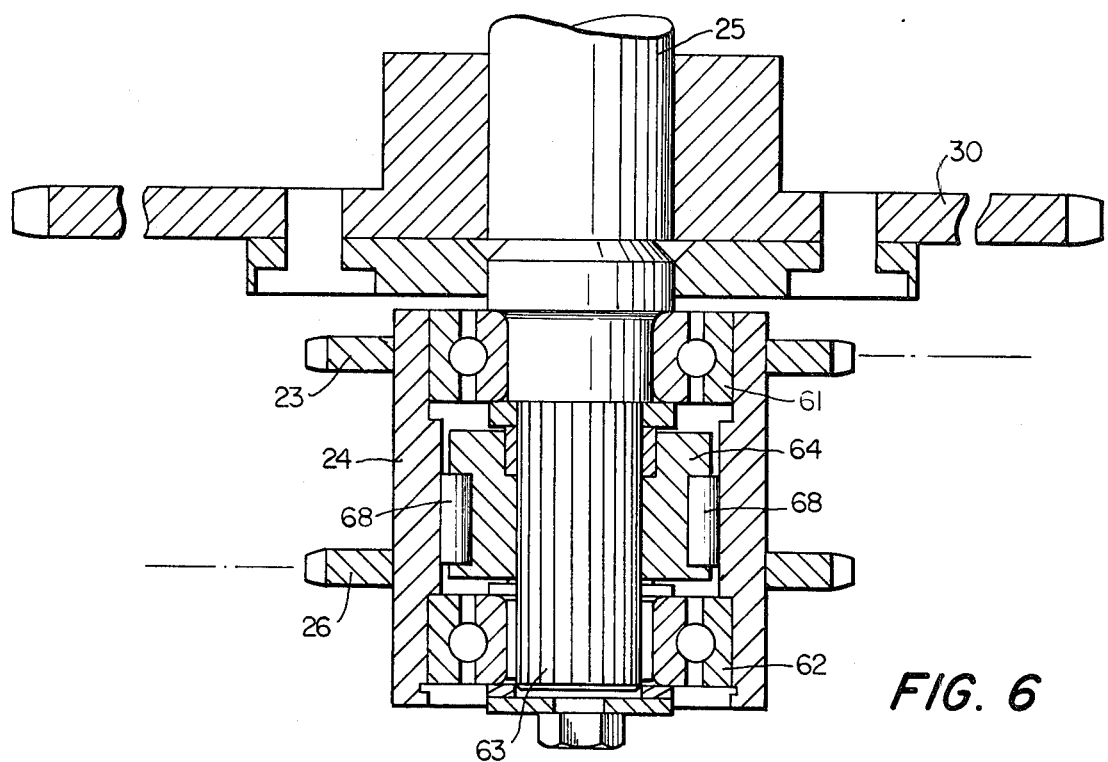

In the operation of the overriding roller clutch assembly, as illustrated in FIG. 6, when the sprocket 23 is driven at a faster rate from chain 17 than driving member 64 is driven by sprocket 30, driven member 24 runs freely and drives the pickup shaft 25 faster than the threshing cylinders. However, when driving member 64 runs at a faster rate than driven member 24, the latter is driven and drives sprockets 23 and 26. In this event, chain 17 drives sprocket 16 and driving member 54 faster than driven member 50 so that the driven member 50 runs freely on shaft 15.

Reference is made to the driving connection between the sheave 12 on wheel 11 and the sheave 14.

Idler pulley 80 is mounted on an arm 81 which is attached by pivot 82 to the body of the combine. A spring 83 is connected to the arm 81 at one end and to a post 82 at the other end and draws the pulley into engagement with the belt 13 to maintain the proper tension thereon for driving.

In the event that the combine has to be transported and driving the pickup P and the threshing cylinders is not desired, the arm 81 may be shifted about the pivot 82 so that a dog 85 which is pivotally mounted on the arm 81 engages a post 86 carried by the combine and holds the arm in such position with the pulley 80 out of driving engagement with the belt 13. The dog is so constructed and arranged with respect to the post 86, that an initial pull of the handle by its operating cable 87 (FIG. 1) engages the dog with the post 86 and the next pull in the same direction disengages the dog.

Figures 10, 11:
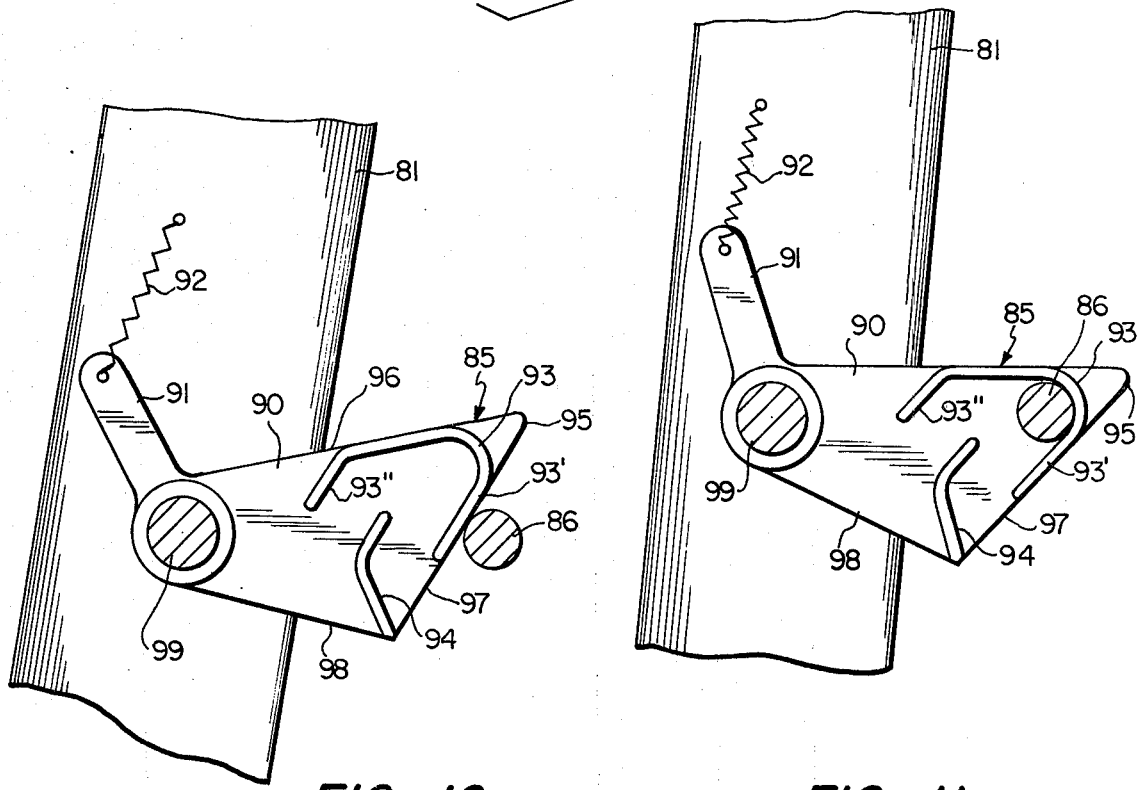
FIG. 10 is a view similar to FIG. 9 illustrating the dog mechanism being moved into latching position.
FIG. 11 is a view of the dog mechanism in latched position.

The details of the dog are shown in FIGS. 8 to 11. The dog comprises a lever having a main portion 90 and an arm 91, the latter connected to a spring 92 tending to hold the lever in the position shown in FIG. 9. The main portion of the dog has an inner U-shaped track member 93 with backwardly and downwardly depending forward and rearward portions 93+ and 93" and an outer abutment 94. Members 93 and 94 are mounted on a side of the main portion 90 which is of generally triangular configuration, having a toe portion 95, a base 96 and inclined portions 97 and 98. When the lever is moved toward the post, the inclined portion 97 engages the post 86, causing the dog to rotate the counterclockwise (as viewed in FIG. 9) around its pivot 99, until the post can be received within the member 93. The lever is then released with the dog engaging the post as shown in FIG. 11. If the lever is again moved in the same direction, the upper portion of the member 93 will ride over the post until the latter is released, whereupon release of the lever permits the spring 83 to draw the pulley 80 back into position for tensioning the belt for driving the sheave.

Figure 7:
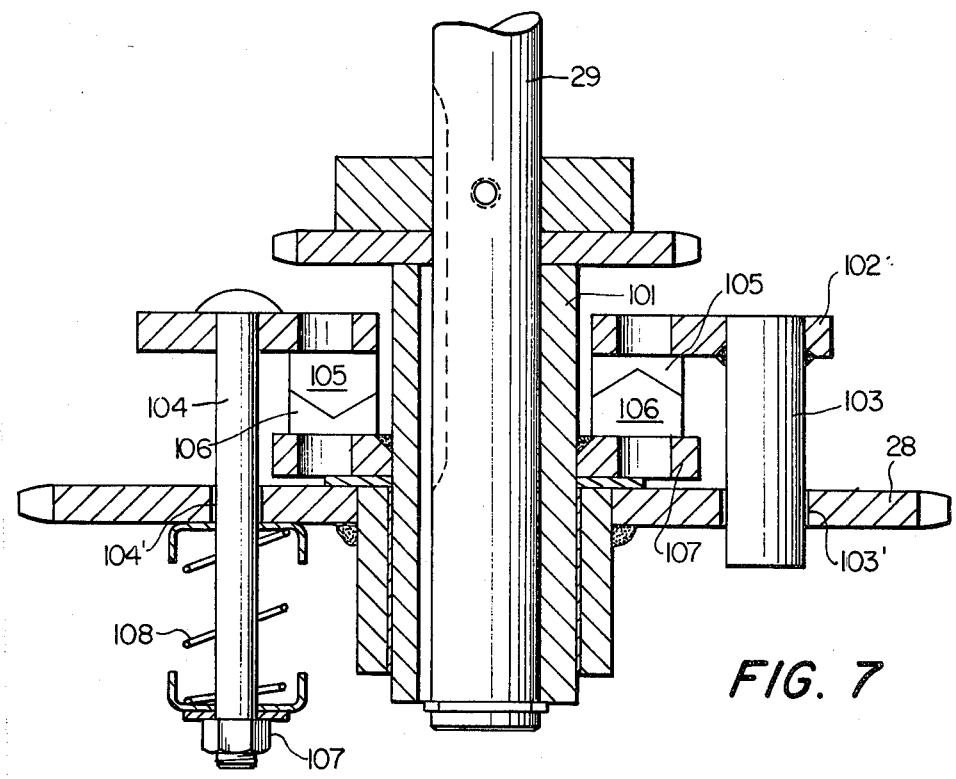
Figure 8:
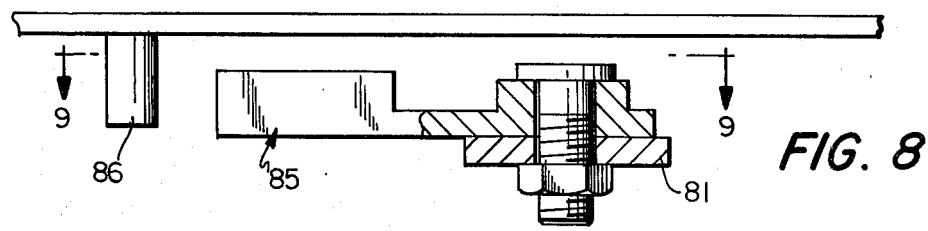
Figure 9:
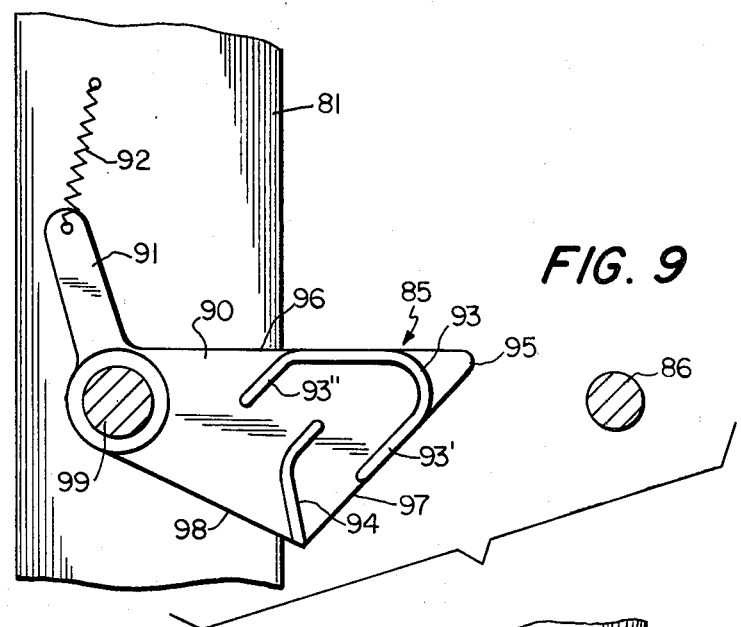
FIG. 9 is a section on the line 9—9 of FIG. 8 illustrating the dog mechanism.

With particular reference to FIG. 7, there is illustrated the details of a releasable drive for the pickup. The sprocket 28 drives the pickup shaft 29 through a ratchet clutch arrangement which will now be described. The sprocket is mounted on a sleeve 101 which is non-rotatably mounted on the shaft 29. The sprocket drives a wheel 102 through posts 103 and 104 which wheel carries driving ratchet teeth 105. The latter are engaged with driven ratchet teeth 106 carried on disk 107 which is fixed to the sleeve 101. In order to urge the ratchet teeth 105 and 106 into intimate engagement with each other, the plate 102 is fixed to the posts 103 and 104, the latter being slidably received in openings 103' and 104' in the sprocket 28. Post 104, constituting a bolt, has a nut 107 and a compression spring 108 at its outer end. Adjustment of the nut varies the force urging the ratchet teeth together.

In the operation of the latter, in the event that an obstruction to rotation of the pickup is encountered sufficient to override the clutch, the shaft 29 may remain fixed with the pickup and the sprocket 28 may rotate thereabout without damage to the equipment.

I claim:

1. In a peanut combine of the type having a frame carrying threshing cylinder means fed by a rotary pickup mounted just above the ground at the forward end of the combine, the combine supported on wheel means and adapted to be towed by a tractor and powered through a power takeoff from the tractor, means for driving said pickup selectively from the power takeoff or from the wheel means supporting the combine, said driving means including first sheave means carried by said wheel means, first shaft means carried by the frame and having second sheave means journaled for rotation thereon, belt means for driving said second sheave means from said first sheave means, the improvement comprising, idler means positioned to engage said belt means, means tending to press said idler means against belt means to maintain a predetermined tension thereon, said idler means being mounted at one end of a lever, said lever being pivotally mounted intermediate its ends on the combine, said lever having a dog mounted on the side of the pivot remote from said idler means and engageable with post means to hold the lever in position in which the idler means is out of engagement with said belt means, said dog having an inner substantially U-shaped track member with backwardly and downwardly forward and rearward depending portions, means tending to hold said dog so that the bight portion of said U-shaped track member is slightly above the level of said post, said dog being pivotally mounted, whereby movement of the lever in one direction brings a forward depending portion of the track member into engagement with the post, thereby pivoting the dog until the post enters the bight portion, and a subsequent movement of the lever in the same direction causes the post to rid rearwardly of the dog and engage the rearward depending portion, thereby pivoting the lever, until the post rides out of the U-shaped track member, thereby permitting the dog to assume its original position.

* * * * *